(12) United States Patent
Lambert et al.

(10) Patent No.: US 12,715,526 B2
(45) Date of Patent: Aug. 25, 2026

(54) ARRANGEMENT FOR IMPROVING TRACTION OF A GROUND ENGAGING ELEMENT OF A VEHICLE

(71) Applicants: Andrew Benjamin Lambert, Fleetwood, PA (US); John D. Vouros, Victor, NY (US)

(72) Inventors: Andrew Benjamin Lambert, Fleetwood, PA (US); John D. Vouros, Victor, NY (US)

( * ) Notice: Subject to any disclaimer, the term of this patent is extended or adjusted under 35 U.S.C. 154(b) by 753 days.

(21) Appl. No.: 18/091,865

(22) Filed: Dec. 30, 2022

(65) Prior Publication Data

US 2023/0211840 A1 Jul. 6, 2023

Related U.S. Application Data

(60) Provisional application No. 63/296,111, filed on Jan. 3, 2022, provisional application No. 63/295,713, filed on Dec. 31, 2021.

(51) Int. Cl.
*B62D 55/28* (2006.01)
*B60C 11/16* (2006.01)
*B62M 27/02* (2006.01)

(52) U.S. Cl.
CPC .......... *B62D 55/28* (2013.01); *B60C 11/1637* (2013.01); *B60C 11/1675* (2013.01);
(Continued)

(58) Field of Classification Search
CPC ... B62D 55/28; B62D 55/286; B60C 11/1637; B60C 11/1675; B60C 11/1693; B62M 27/027; B62M 2027/027
(Continued)

(56) References Cited

U.S. PATENT DOCUMENTS 3,865,441 A * 2/1975 Jolliffe .................. B62D 55/26 180/9.1
3,973,808 A * 8/1976 Janssen .................. B62D 55/24 305/180
(Continued)

OTHER PUBLICATIONS

Woody's Competition Catalog, "Team Woody's" Competition Commodities 2018-19_092618 https://fliphtml5.com/fehs/adxo/basic, pp. 1-12, dated Apr. 2, 2025.
(Continued)

*Primary Examiner* — S. Joseph Morano
*Assistant Examiner* — Eva L Comino
(74) *Attorney, Agent, or Firm* — Eckert Seamans Cherin & Mellott, LLC

(57) ABSTRACT

A chisel nut for use in improving traction of a ground engaging drive element of a vehicle includes a body having a first end for engaging the ground engaging drive element and a second end disposed opposite the first end. A chisel face is defined on a side of the body spaced a distance from the first end and extending to an edge at the second end of the body. The chisel face sized and configured to extend outward from the ground engaging drive element beyond lug members of the ground engaging drive element. A hole is defined in the body about a longitudinal axis and extends from an opening at the first end of the body toward the second end of the body. The hole includes a threaded portion for threadingly engaging with a threaded portion of a cooperatively sized fastener positioned in the hole.

4 Claims, 5 Drawing Sheets

(52) U.S. Cl.
CPC .......... *B60C 11/1693* (2013.01); *B62M 27/02* (2013.01); *B62M 2027/027* (2013.01)

(58) Field of Classification Search
USPC .......................................................... 305/180
See application file for complete search history.

(56) References Cited

U.S. PATENT DOCUMENTS 4,758,005 A * 7/1988 Fox ......................... B23P 15/06 277/497
5,573,316 A * 11/1996 Wankowski ......... B62D 55/286 305/180
5,685,621 A 11/1997 Nugent
5,690,398 A * 11/1997 Pribyl ..................... B60C 27/16 305/180
5,921,642 A * 7/1999 Tschida ................ B62D 55/286 305/180
5,980,001 A * 11/1999 Rubel .................... B62D 55/27 305/180
6,203,126 B1 * 3/2001 Harguth ............... B62D 55/286 305/180
9,242,685 B2 * 1/2016 Pattyn .................... B62D 55/28
10,196,102 B2 * 2/2019 Pattyn .................... B62D 55/28
2013/0049453 A1 * 2/2013 Pattyn .................. B62D 55/286 305/191

OTHER PUBLICATIONS

Facebook, “Arnie’s Cat House’s post” https://www.facebook.com/Arniescathouse/posts/arnies-got-traction-ok-sizes-1860-from-top-to-base-the-base-is-1500-across-recom/541595806210050/ Dated Feb. 20, 2018, 2 pp.
Facebook, “Hellevation Elevated Traction’s post” https://www.facebook.com/hellevationdesign/posts/pfbid02nFox8cafVC7ShsrQYaVXVG3Bdp9ug7HZtubmh8cyAP4sCFRT9b5UixmR2Bg8dsK1l Dated Dec. 30, 2021, 2 pp.

* cited by examiner 14
12
18
46
20
10
16
26
22

14
12
18
46
20
10
16

10
18
20
23
146
d
14
24
16
26
46
22
12
28

12
46
30
46
22
34
24
32
14

108
114
112
110
116

108
112
114
110

ARRANGEMENT FOR IMPROVING TRACTION OF A GROUND ENGAGING ELEMENT OF A VEHICLE

CROSS REFERENCE TO RELATED APPLICATIONS

This application claims priority to U.S. Patent Application Ser. No. 63/296,111, filed Jan. 3, 2022, entitled CHISEL NUT, and also claims priority to U.S. Patent Application Ser. No. 63/295,713, filed Dec. 31, 2021, entitled CHISEL NUT, both of which are incorporated in their entirety herein by reference.

FIELD OF THE INVENTION

The disclosed concept relates to arrangements for increasing traction of a motorized track used in propelling a vehicle, and more particularly to chisel nuts and arrangements including such elements for increasing traction of a motorized track of a snowmobile. The disclosed concept also relates snowmobile tracks including such arrangements.

BACKGROUND OF THE INVENTION

A snowmobile, also known as a snowmachine, sled, motor sled, motor sledge, skimobile, or snow scooter, is a motorized vehicle designed for winter travel and recreation. Snowmobiles are designed to be operated on snow and ice and do not require a road or trail, but most are driven on open terrain or trails.

Most snowmobiles do not have any enclosures, except for a windshield, and their engines normally drive a continuous track at the rear, while skis at the front provide directional control. Early snowmobiles used simple rubber tracks, but modern snowmobiles' tracks are usually made of a Kevlar composite construction.

Snowmobiling is a sport that many people have taken on as a serious hobby. The second half of the 20th century saw the rise of recreational snowmobiling as well as competitive events such as snowcross/racing and freestyle. From such competitive events, a continuous demand for improvements in all performance aspects of snowmobiles exists.

SUMMARY OF THE INVENTION

Embodiments of the present invention improve upon shortcomings in existing arrangements, particularly shortcomings in traction arrangements. As one aspect of the present invention a chisel nut for use in improving traction of a ground engaging drive element of a vehicle is provided. The chisel nut comprises: a body having a first end structured to engage the ground engaging drive element and a second end disposed opposite the first end; a chisel face defined in a side of the body spaced a distance from the first end and extending to an edge at the second end of the body, the chisel face sized and configured to extend outward from the ground engaging drive element beyond lug members of the ground engaging drive element; and a hole defined in the body about a longitudinal axis and extending from an opening at the first end of the body toward the second end of the body, the hole having a threaded portion structured to threadingly engage with a threaded portion of a cooperatively sized fastener positioned in the hole.

The chisel nut may further comprise an indexing structure defined by the body at or about the first end of the body, the indexing structure structured to prevent rotation of the body about the longitudinal axis when the chisel nut is coupled to the ground engaging drive element by the fastener. The indexing structure may comprise a plurality of grooves defined in the first end of the body. The body may comprise a flared base portion extending radially outward from the first end of the body, the flared base portion having an engagement surface structured to engage the ground engaging drive element when the chisel nut is coupled to the ground engaging drive element by the fastener, and the indexing structure may comprise a number of features extending into or from the engagement surface. The number of features may comprise a plurality of through holes extending through the flared base portion. The indexing structure may comprise a number of flats defined on a number of sides of the body. The body may comprise a flared base portion extending radially outward from the first end of the body, the flared base portion having an engagement surface structured to engage the ground engaging drive element when the chisel nut is coupled to the ground engaging drive element by the fastener, and the indexing structure may comprise a number of features defined by an outer portion of the flared base portion. The number of features may comprise a flat formed in the outer periphery of the flared base portion, the flat being sized and configured to engage with a corresponding flat of another chisel nut when the chisel nut and the other chisel nut are positioned adjacent each other and coupled to the ground engaging drive element by respective fasteners. The hole may be a through hole extending to a second opening defined the second end of the body. The hole may be a blind hole extending to a closed end spaced a distance inward from the second end of the body. The chisel face may be concavely shaped about a number of axis. The ground engaging drive element may comprise a track or a tire.

As another aspect of the present invention, a chisel nut for use in improving traction of a ground engaging drive element of a vehicle is provided. The chisel nut comprises: a body having a first end structured to engage the ground engaging drive element and a second end disposed opposite the first end; a chisel face defined in a side of the body spaced a distance from the first end and extending to an edge at the second end of the body, the chisel face sized and configured to extend outward from the ground engaging drive element beyond lug members of the ground engaging drive element; a through hole defined in the body about a longitudinal axis and extending from a first opening at the first end of the body to a second opening defined in or near the second end of the body, the through hole having a threaded portion structured to threadingly engage with a threaded portion of a cooperatively sized fastener positioned in the hole; and an indexing structure defined by the body at or about the first end of the body, the indexing structure structured to prevent rotation of the body about the longitudinal axis when the chisel nut is coupled to the ground engaging drive element by the fastener.

The indexing structure may comprise a plurality of grooves defined in the first end of the body. The body may comprise a flared base portion extending radially outward from the first end of the body, the flared base portion having an engagement surface structured to engage the ground engaging drive element when the chisel nut is coupled to the ground engaging drive element by the fastener, and the indexing structure may comprise a number of features extending into or from the engagement surface. The number of features may comprise a plurality of through holes extending through the flared base. The indexing structure may comprise a number of flats defined on a number of sides of the body. The body may comprise a flared base portion extending radially outward from the first end of the body, the flared base portion having an engagement surface structured to engage the ground engaging drive element when the chisel nut is coupled to the ground engaging drive element by the fastener, and the indexing structure may comprise a number of features defined by an outer portion of the flared base portion. The number of features may comprise a flat formed in the outer periphery of the flared base portion, the flat being sized and configured to engage with a corresponding flat of another chisel nut when the chisel nut and the other chisel nut are positioned adjacent each other and coupled to the ground engaging drive element by respective fasteners.

As a further aspect of the present invention, a traction improving arrangement for coupling to a ground engaging drive element of a vehicle is provided. The arrangement comprises: a fastener having a threaded portion; and a chisel nut comprising: a body having a first end structured to engage the ground engaging drive element and a second end disposed opposite the first end; a chisel face defined in a side of the body spaced a distance from the first end and extending to an edge at the second end of the body, the chisel face sized and configured to extend outward from the ground engaging drive element beyond lug members of the ground engaging drive element; a hole defined in the body about a longitudinal axis and extending from an opening at the first end of the body toward the second end of the body, the hole having a threaded portion structured to threadingly engage with the threaded portion of the fastener; and an indexing structure defined by the body at or about the first end of the body, the indexing structure structured to prevent rotation of the body about the longitudinal axis when the chisel nut is coupled to the ground engaging drive element by the fastener.

As yet another further aspect of the present invention, a traction improving arrangement for coupling to a ground engaging drive element of a vehicle is provided. The arrangement comprises: a fastener having a threaded portion; and a chisel nut comprising: a body having a first end structured to engage the ground engaging drive element and a second end disposed opposite the first end; a chisel face defined in a side of the body spaced a distance from the first end and extending to an edge at the second end of the body, the chisel face sized and configured to extend outward from the ground engaging drive element beyond lug members of the ground engaging drive element; and a through hole defined in the body about a longitudinal axis and extending from a first opening at the first end of the body to a second opening defined in or near the second end of the body, the hole having a threaded portion structured to threadingly engage with the threaded portion of the fastener to couple the chisel nut to the ground engaging drive element, wherein the fastener is sized and configured to protrude from the second opening of the body of the chisel nut a distance beyond the edge of the chisel face when the chisel nut is coupled to the ground engaging drive element with the fastener.

The chisel nut may further comprise an indexing structure defined by the body at or about the first end of the body, the indexing structure structured to prevent rotation of the body about the longitudinal axis when the chisel nut is coupled to the ground engaging drive element by the fastener.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are provided for the purpose of illustration and description only and are not intended as a definition of the limits of the concept.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figures 1A, 1B, 2, 3, 4A, 4B:
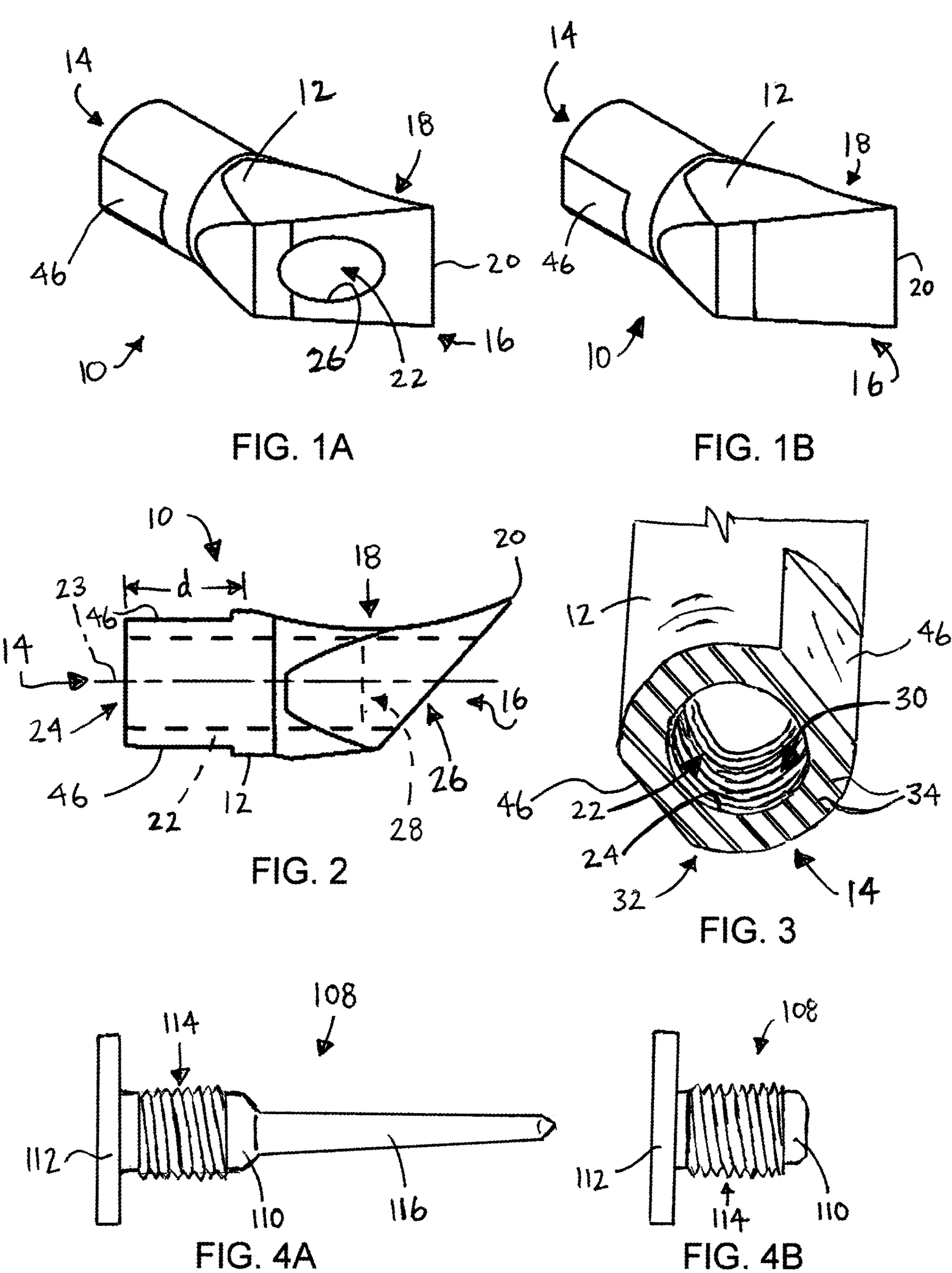
FIG. 1A is a perspective view of a chisel nut in accordance with one example embodiment of the present invention.
FIG. 1B is a perspective view of another chisel in accordance with another example embodiment of the present invention.
FIG. 2 is side view of the chisel nut of FIG. 1A.
FIG. 3 is a perspective view of an end of the chisel nut of FIG. 1A.
FIG. 4A is a side view of a fastener in accordance with an example embodiment of the present invention for use with the chisel nut of FIG. 1A.
FIG. 4B is a side view of a fastener in accordance with another example embodiment of the present invention for use with the chisel nut of FIG. 1B.

The specific elements illustrated in the drawings and described herein are simply exemplary embodiments of the disclosed concept. Accordingly, specific dimensions, orientations and other physical characteristics related to the embodiments disclosed herein are not to be considered limiting on the scope of the disclosed concept unless otherwise specified herein.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are coupled in direct contact with each other without any intermediary elements.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

In general, embodiments of the present invention are directed toward a chisel nut (e.g., formed from CNC machining a billet aluminum or from other suitable material(s)/process(es)) that includes hole having a threaded portion. The hole may extend only partially through, or completely through (i.e., a through-hole), the chisel nut. The through-hole may be structured to provide for a stud (e.g., formed from carbide or other suitable material) to extend therethrough and threadingly engage a portion thereof. The chisel nut can be coupled with a corresponding stud to a ground engaging drive element of a vehicle (e.g., without limitation, a rubber track of a snowmobile, a tire of a side-by-side or other off-road vehicle, or any other suitable location/mechanism for improving traction/grip). The chisel nut includes a flared chisel face having an enlarged area to provide increased traction in ice/snow. Preferably, the chisel face ends with a sharp chisel edge. The chisel nut/stud is/are sized such that the stud extends to at least the tip of the chisel nut if not beyond (e.g., flush to around ¼" extension with respect to the end) such that the stud engages with any hard surfaces the track/tire is passing over during travel and not the chisel face. The chisel nut can be included as part of a chisel nut assembly that includes an insert coupled to the end of the chisel nut. The insert may be provided in place of, or in addition to a stud that passes completely through the chisel nut. The insert may be coupled to the chisel body via: any suitable retention member (e.g., a torx screw, etc.), a press fit, or via any other suitable arrangement. The chisel nut may include one or more arrangements to grip and/or otherwise directly engage with a track/tire/etc. to which they are coupled and/or with a backer plate. The chisel nut may include an integrated backer plate having such one or more arrangements as well as other features for engaging the track/tire/etc. and/or be shaped in a manner to engage and/or interlock with the integrated backing plate of one or more other chisel nuts.

Referring now first to FIG. 1A, a chisel nut 10 for coupling to a ground engaging drive element of a vehicle for improving traction thereof in accordance with one example embodiment of the present invention is shown. Chisel nut 10 is formed from a rigid material (e.g., billet aluminum) and includes a body 12 having a first end 14 structured to engage the ground engaging drive element and a second end 16 disposed opposite first end 14. Chisel nut 10 also includes a chisel face 18 defined in a side of body 12 and spaced a distance d from first end 14 and extending to an outermost chisel edge 20 at second end 16 of body 12. Chisel face 18 is sized and configured to extend outward from the ground engaging drive element beyond lug members of the ground engaging drive element. As previously discussed, chisel face 18 is typically a flared surface having an enlarged area to grab at the snow, ice, mud, etc. to provide for increased traction in ice/snow. In some example embodiments, chisel face 18 has a width of ⅝" or larger while first end 14 is smaller in width (e.g., ½"). Chisel edge 20 is preferably a sharp edge for gripping into ice or other items of the particular environment. Ideally, chisel face 18 is oriented facing the opposite direction from the direction of travel of the vehicle. Chisel face 18 may be concavely shaped or cupped in one or more directions (i.e., about one or more reference axis so as to be simply curved or bowl shaped).

Chisel nut 10 further includes a hole 22 defined in body 12 about a longitudinal axis 23 (FIG. 2). In the example shown in FIG. 1A, hole 22 is a through hole that extends from a first opening 24 (FIG. 2) at first end 14 of body 12 to a second opening 26 (FIGS. 1A and 2) defined in second end 26 of body 12. In contrast, in the example shown in FIG. 1B, hole 22 is a blind hole that extends from a first opening 24 (FIG. 2) at first end 14 of body 12 to a closed end 28, as shown in FIG. 2, that is spaced inward from second end 16 of body 12 (and thus is not shown is visible in FIG. 1B). Hole 22 includes a threaded portion 30 (FIG. 3) that is structured to threadingly engage with a threaded portion of a cooperatively sized fastener positioned in the hole, as discussed further below.

Chisel nut 10 may include an indexing arrangement/structure 32 defined by body 12 at or about first end 14 thereof that is structured to prevent rotation of body 12 about longitudinal axis 23 when chisel nut 10 is coupled to a ground engaging drive element of a vehicle by a fastener as discussed further below. It is to thus be appreciated that indexing structure 32 ensures that chisel face 18 is oriented and maintained in a desired positioning to maximize traction of the ground engaging drive element to which chisel nut 10 is coupled. In the example shown in FIG. 3, indexing structure 32 includes a plurality of grooves 34 (only two are labeled) defined in first end 14 of body 12. In some other example embodiments, such as shown in FIGS. 7-10, indexing structure 32 is formed as a flared base portion 36 of body 12 that extends radially outward from first end 14 of body 12. Flared base portion 36 includes an engagement surface (not numbered) that is structured to engage the ground engaging drive element when chisel nut 10 is coupled to the ground engaging drive element by a fastener. In such arrangement, indexing structure 32 includes a number of features 38 extending into or from the engagement surface. In the example embodiments shown in FIGS. 7-10, such feature 38 include a plurality of through holes 40, each extending through flared base portion 36. When chisel nut 10 is coupled to, and tightened against, a ground engaging drive element such as a rubber track of a snowmobile or tire of a vehicle, the rubber material will extend a bit into each of through holes 40, thus preventing rotation of chisel nut 10 about longitudinal axis 23. It is to be appreciated that through holes 40 are provided for example purposes only and that other arrangements (e.g., without limitation, grooves, ridges, dimples, etc.) may be provided as features 38 without varying from the scope of the present invention.

In addition to, or instead of features 38 which interact directly with the ground engaging drive element, chisel nut

Figure 9:
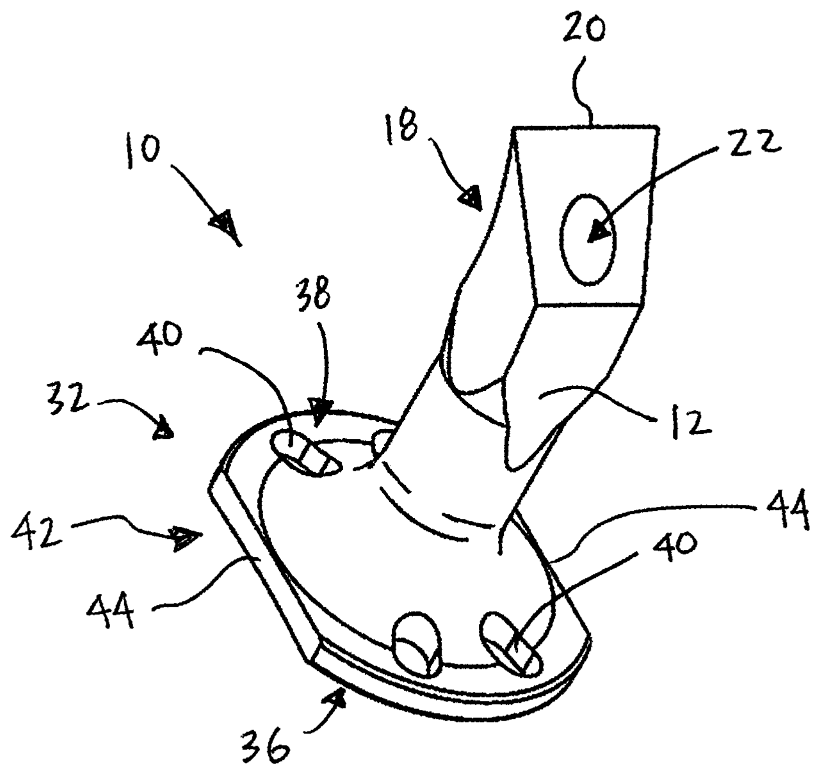
FIG. 9 is a perspective view of a chisel nut in accordance with a further example embodiment of the present invention.
Figure 10:
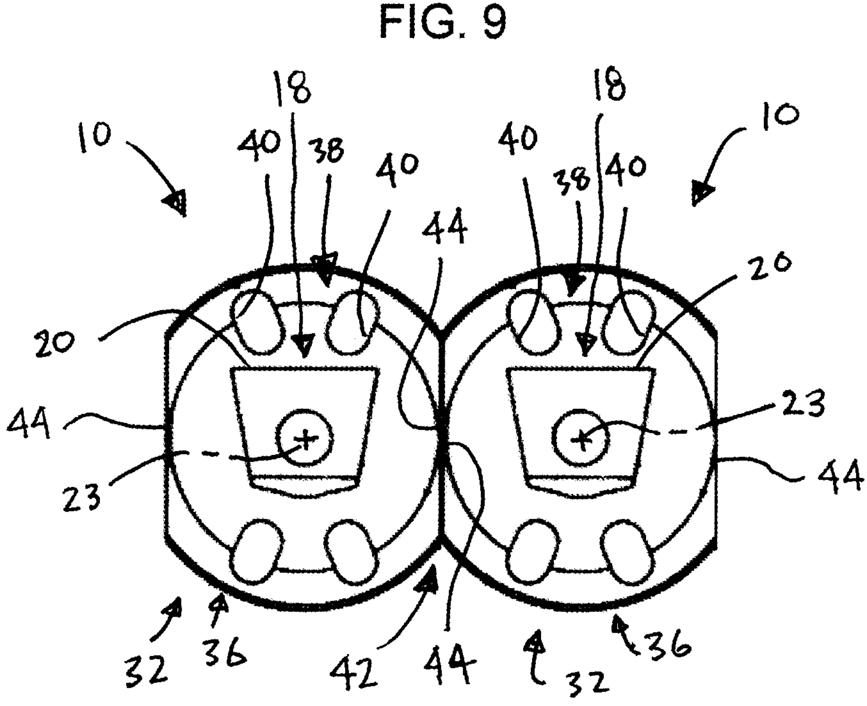
FIG. 10 is a top view of the chisel nut shown in FIG. 9 shown with a second chisel nut of the same design positioned adjacent thereto and interacting therewith.

10 may include other features 42 which interact with other elements, such as another chisel nut 10, in order to prevent rotation of chisel nut 10 about longitudinal axis 23. In the example embodiment shown in FIGS. 9 and 10, such other features 42 include a number of flats 44 defined on a number of sides of body 12, and more particularly a pair of flats 44 defined opposite of each other on the outer periphery of flared base portion 36. As shown in FIG. 10, where two of such chisel nuts 10 of FIG. 9 are positioned adjacent each other on a ground engaging drive element, corresponding flats 44 of each chisel nut 10 interact in a manner that prevents rotation of either chisel nut 10 about the corresponding longitudinal axis 23 of each.

Figure 11:
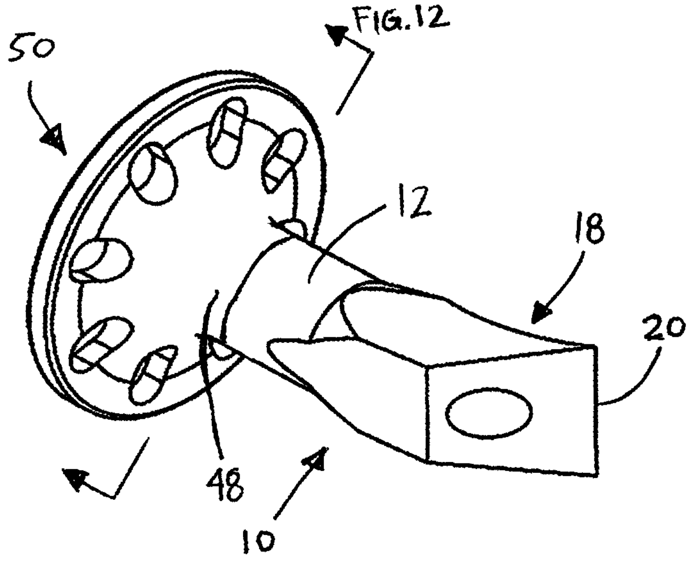
FIG. 11 is a perspective view of a modular chisel nut arrangement in accordance with an example embodiment of the present invention.
Figure 12:
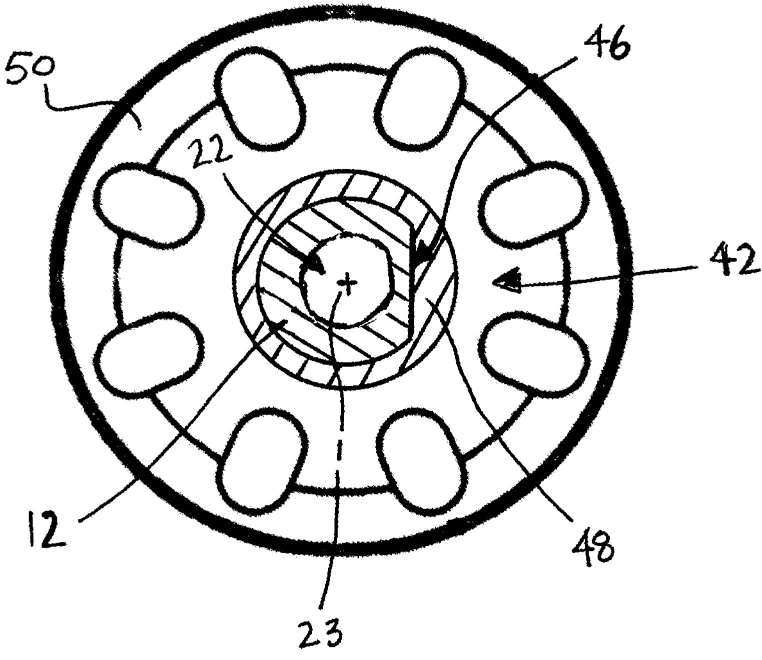
FIG. 12 is a sectional view of the portion of the arrangement of FIG. 11 as indicated in FIG. 11.

As another example such as shown in FIGS. 11 and 12, chisel nut 10 may include a number of flats 46 (one is included in the arrangement of FIGS. 11 and 12) positioned on one or more sides of body 12. Each flat 46 engages with a cooperatively positioned surface (not numbered) of a socket portion 48 of a base member 50 that directly engages with a ground engaging drive element.

Figure 5:
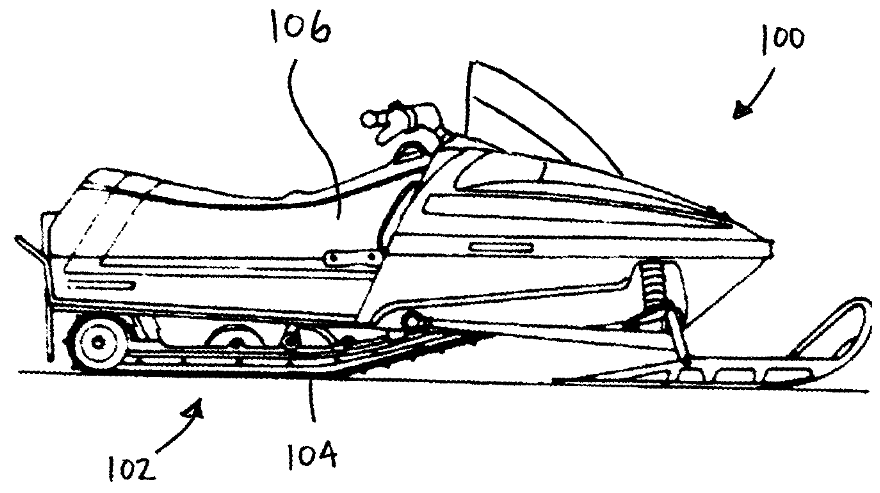
FIG. 5 is a side view of a snowmobile having a motorized track with which example embodiments of the present invention may be employed.

Having thus described several examples of chisel nuts 10 and some example features thereof, a traction improving arrangement 50 for coupling to a ground engaging drive element 102 of a vehicle 100 will now be described in conjunction with FIGS. 5 and 6. In such example, ground engaging drive element 102 is a rubber track 104 of a snowmobile 106, such as shown in FIG. 5. In the example shown in FIG. 6, chisel nut 10 is coupled to rubber track 104 via a fastener 108 such as shown in FIG. 4A. In the example shown in FIG. 6, track 104 moves in a direction such as shown by arrow A when snowmobile 106 moves forward in a second direction as shown by arrow B.

Referring to FIG. 4A, fastener 108 includes an elongated body 110 (formed from a hard material such as Carbide or other suitable material) including a head portion 112 structured to be engaged by a suitable tool (e.g., an allen wrench, or other suitable arrangement), a threaded portion 114, and a stud portion 116 extending outward from threaded portion 114 opposite head portion 112. In coupling/securing chisel nut 10 to track 104, the threaded portion 30 of chisel nut 10 is threadingly engaged, and tightened (e.g., via engagement of an allen wrench with head portion 112 of fastener 108 and a wrench with opposing flats 46 of chisel nut 10 and subsequent rotation of one or both elements) with threaded portion 114 of fastener 108. In such arrangement, a rigid backer plate 120 is positioned between grooves 34 of first end 14 of chisel nut 10, however it is to be appreciated that such arrangement is provided for example purposes only and that chisel nut 10 may be disposed in direct engagement with track 104 without varying from the scope of the present invention. It is also to be appreciated that in such arrangement, edge 20, and thus chisel face 18 of chisel nut 10, extends a face distance $F_D$ beyond lugs 120 of track 104 such that chisel face 18 engages with material (e.g., show, ice, etc.) beyond that otherwise engaged by track 104. Further, it is to be appreciated that in such arrangement due to hole 22 being a through hole and fastener 108 having stud portion 116, stud portion 116 of fastener 108 extends an extension distance ED beyond edge 20 and thus beyond chisel face 18. As a result, edge 20 and chisel face 18 are generally protected from vertical loading when vehicle 100 passes over hard objects (e.g., rocks, pavement, ice, etc.).

Figure 6:
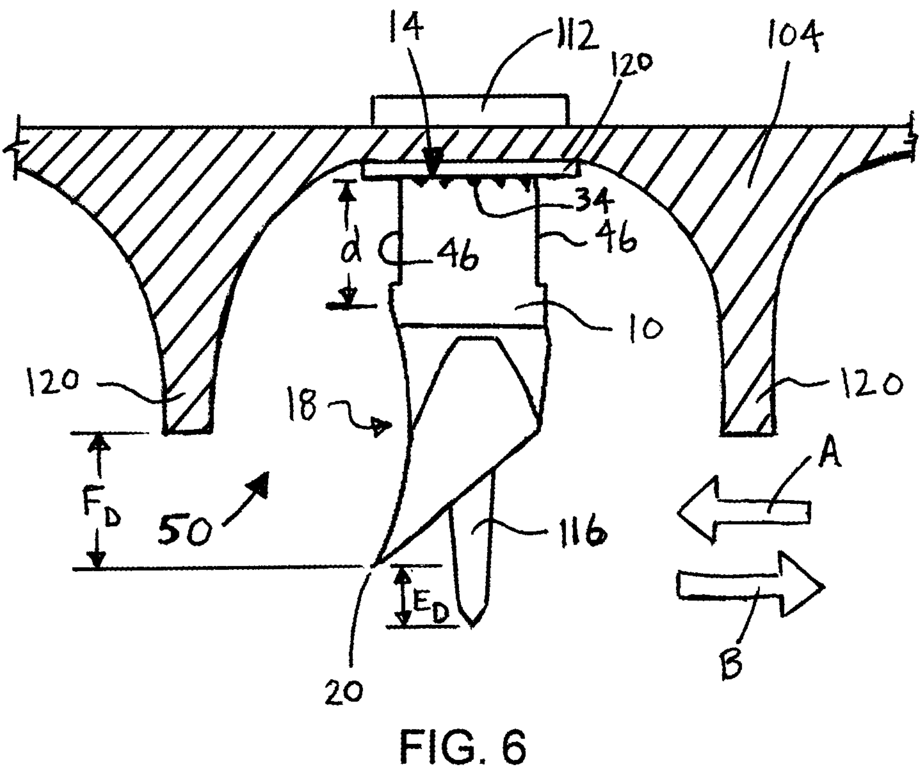
FIG. 6 is a partially sectional elevation view of a portion of the track of the snowmobile of FIG. 5 showing a chisel nut and fastener such as shown in FIGS. 1A and 4A employed therewith in accordance with an example embodiment of the present invention.
Figure 7:
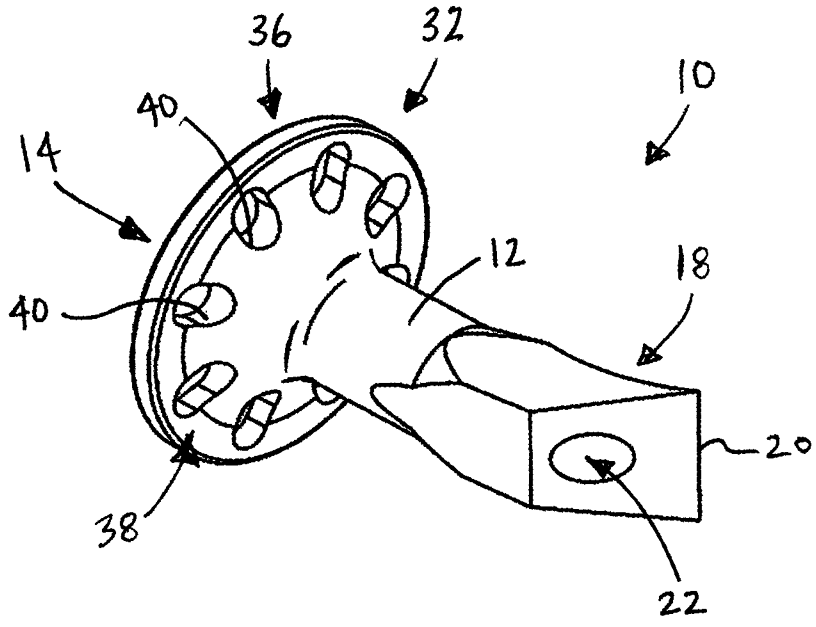
FIG. 7 is a perspective view of a chisel nut in accordance with yet another example embodiment of the present invention.
Figure 8:
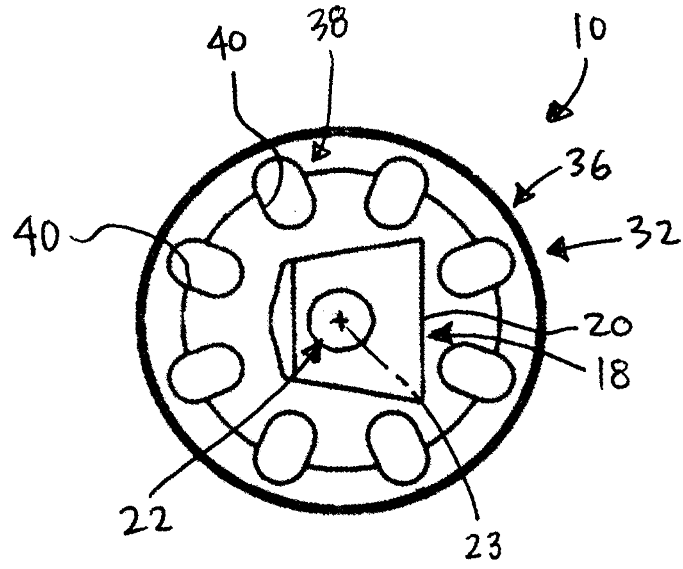
FIG. 8 is a top view of the chisel nut of FIG. 7.

As an alternative to the arrangement shown in FIG. 6, in an example wherein a chisel nut 10 includes a blind hole 22 having a closed end 28, fastener 108 of FIG. 4B would be employed in securing chisel nut 10 (e.g., such as shown in FIG. 1B) to ground engaging drive element 102.

From the foregoing, it is thus to be appreciated that embodiments of the present invention provide arrangements for increasing the traction of a vehicle. It is further to be appreciated that such arrangements provide for customization/tailoring of the placement of such arrangements to meet requirements of a particular application.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A chisel nut for use in improving traction of a ground engaging drive element of a vehicle, the chisel nut comprising:

a body having a first end structured to engage the ground engaging drive element and a second end disposed opposite the first end;

a chisel face defined in a side of the body spaced a distance from the first end and extending to an edge at the second end of the body, the chisel face sized and configured to extend outward from the ground engaging drive element beyond lug members of the ground engaging drive element;

a hole defined in the body about a longitudinal axis and extending from an opening at the first end of the body toward the second end of the body, the hole having a threaded portion structured to threadingly engage with a threaded portion of a cooperatively sized fastener positioned in the hole; and an indexing structure defined by the body at or about the first end of the body, the indexing structure structured to prevent rotation of the body about the longitudinal axis when the chisel nut is coupled to the ground engaging drive element by the fastener, wherein:

the body comprises a flared base portion extending radially outward from the first end of the body, the flared base portion having an engagement surface structured to engage the ground engaging drive element when the chisel nut is coupled to the ground engaging drive element by the fastener, the indexing structure comprises a number of features extending into or from the engagement surface, and wherein the number of features comprises a plurality of through holes extending through the flared base portion.

2. A chisel nut for use in improving traction of a ground engaging drive element of a vehicle, the chisel nut comprising:

a body having a first end structured to engage the ground engaging drive element and a second end disposed opposite the first end;

a chisel face defined in a side of the body spaced a distance from the first end and extending to an edge at the second end of the body, the chisel face sized and configured to extend outward from the ground engaging drive element beyond lug members of the ground engaging drive element;

a through hole defined in the body about a longitudinal axis and extending from a first opening at the first end of the body to a second opening defined in or near the second end of the body, the through hole having a threaded portion structured to threadingly engage with a threaded portion of a cooperatively sized fastener positioned in the hole; and an indexing structure defined by the body at or about the first end of the body, the indexing structure structured to prevent rotation of the body about the longitudinal axis when the chisel nut is coupled to the ground engaging drive element by the fastener, wherein:

the body comprises a flared base portion extending radially outward from the first end of the body, the flared base portion having an engagement surface structured to engage the ground engaging drive element when the chisel nut is coupled to the ground engaging drive element by the fastener, the indexing structure comprises a number of features extending into or from the engagement surface, and the number of features comprises a plurality of through holes extending through the flared base.

3. A traction improving arrangement for coupling to a ground engaging drive element of a vehicle, the arrangement comprising:

a fastener having a threaded portion; and a chisel nut comprising:

a body having a first end structured to engage the ground engaging drive element and a second end disposed opposite the first end;

a chisel face defined in a side of the body spaced a distance from the first end and extending to an edge at the second end of the body, the chisel face sized and configured to extend outward from the ground engaging drive element beyond lug members of the ground engaging drive element;

a hole defined in the body about a longitudinal axis and extending from an opening at the first end of the body toward the second end of the body, the hole having a threaded portion structured to threadingly engage with the threaded portion of the fastener; and an indexing structure defined by the body at or about the first end of the body, the indexing structure structured to prevent rotation of the body about the longitudinal axis when the chisel nut is coupled to the ground engaging drive element by the fastener;

wherein:

the body comprises a flared base portion extending radially outward from the first end of the body, the flared base portion having an engagement surface structured to engage the ground engaging drive element when the chisel nut is coupled to the ground engaging drive element by the fastener, and the indexing structure comprises a plurality of through holes extending through the flared base.

4. A traction improving arrangement for coupling to a ground engaging drive element of a vehicle, the arrangement comprising:

a fastener having a threaded portion; and a chisel nut comprising:

a body having a first end structured to engage the ground engaging drive element and a second end disposed opposite the first end;

a chisel face defined in a side of the body spaced a distance from the first end and extending to an edge at the second end of the body, the chisel face sized and configured to extend outward from the ground engaging drive element beyond lug members of the ground engaging drive element; and a through hole defined in the body about a longitudinal axis and extending from a first opening at the first end of the body to a second opening defined in or near the second end of the body, the hole having a threaded portion structured to threadingly engage with the threaded portion of the fastener to couple the chisel nut to the ground engaging drive element, wherein the fastener is sized and configured to protrude from the second opening of the body of the chisel nut a distance beyond the edge of the chisel face when the chisel nut is coupled to the ground engaging drive element with the fastener, wherein the chisel nut further comprises an indexing structure defined by the body at or about the first end of the body, the indexing structure structured to prevent rotation of the body about the longitudinal axis when the chisel nut is coupled to the ground engaging drive element by the fastener, wherein the body comprises a flared base portion extending radially outward from the first end of the body, the flared base portion having an engagement surface structured to engage the ground engaging drive element when the chisel nut is coupled to the ground engaging drive element by the fastener, and wherein the indexing structure comprises a plurality of through holes extending through the flared base.

* * * * *